United States Patent
Buchmayer et al.

(10) Patent No.: US 10,419,944 B2
(45) Date of Patent: Sep. 17, 2019

(54) FREQUENCY SPECTRUM ASSIGNMENT

(71) Applicant: Telefonaktiebolaget LM Ericsson (publ), Stockholm (SE)

(72) Inventors: Mats Buchmayer, Stockholm (SE); Kumar Balachandran, Pleasanton, CA (US)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 16/089,420

(22) PCT Filed: Mar. 29, 2016

(86) PCT No.: PCT/SE2016/050257
§ 371 (c)(1),
(2) Date: Sep. 28, 2018

(87) PCT Pub. No.: WO2017/171591
PCT Pub. Date: Oct. 5, 2017

(65) Prior Publication Data
US 2019/0132744 A1    May 2, 2019

(51) Int. Cl.
H04W 16/14    (2009.01)
H04W 72/04    (2009.01)
(Continued)

(52) U.S. Cl.
CPC .......... *H04W 16/14* (2013.01); *H04W 24/02* (2013.01); *H04W 28/16* (2013.01);
(Continued)

(58) Field of Classification Search
CPC ............... H04W 16/14; H04W 72/042; H04W 74/0833; H04W 72/04; H04W 24/10;
(Continued)

(56) References Cited

U.S. PATENT DOCUMENTS

| 2011/0077042 A1* | 3/2011 | Stanforth ............ H04W 72/10 455/512 |
|---|---|---|
| 2014/0080535 A1 | 3/2014 | Gauvreau et al. |
| 2015/0087347 A1 | 3/2015 | Roberts et al. |

OTHER PUBLICATIONS

Federal Communications Commission, "Further Notice of Proposed Rulemaking", In the Matter of Amendment of the Commission's Rules with Regard to Commercial Operations in the 3550-3650 MHz Band, FCC 14-49, GN Docket No. 12-354, Apr. 23, 2014, pp. 1-120.

(Continued)

*Primary Examiner* — Kwasi Karikari
(74) *Attorney, Agent, or Firm* — Sage Patent Group

(57) ABSTRACT

A spectrum management device (110) determines spectrum assignments (205, 215) for a radio access node (120). The spectrum assignments (205, 215) comprise an access spectrum assignment (205) and a failover spectrum assignment (215) for replacing at least part of the access spectrum assignment (205) responsive to a conflict between the radio access node (120) and an incumbent user (130) with respect to the access spectrum assignment (205). The radio access node (120) is notified of the spectrum assignments (205, 215), and in response, the radio access node (120) commences radio communications according to the access spectrum assignment (205). In response to receiving notification to discontinue use of the at least part of the access spectrum assignment (205), the radio access node (120) replaces the at least part of the access spectrum assignment (205) with at least part of the failover spectrum assignment (215).

14 Claims, 12 Drawing Sheets

(51) Int. Cl.
*H04W 24/02* (2009.01)
*H04W 28/16* (2009.01)
*H04W 24/04* (2009.01)
*H04W 76/25* (2018.01)

(52) U.S. Cl.
CPC ........ *H04W 72/0453* (2013.01); *H04W 24/04* (2013.01); *H04W 76/25* (2018.02)

(58) Field of Classification Search
CPC ......... H04W 72/0453; H04W 72/0446; H04W 72/082; H04W 72/14; H04W 72/12; H04W 72/0486; H04W 16/10; H04W 28/26; H04W 28/08; H04W 28/16; H04W 28/18; H04W 36/305; H04W 56/002; H04W 72/048; H04W 72/0493; H04W 72/08; H04W 72/1231; H04L 47/781; H04L 5/0035; H04L 47/78; H04L 5/0073
See application file for complete search history.

(56) References Cited

OTHER PUBLICATIONS

Federal Communications Commission, "Report and Order and Second Further Notice of Proposed Rulemaking", In the Matter of Amendment of the Commission's Rules with Regard to Commercial Operations in the 3550-3650 MHz Band, FCC 15-47, GN Docket No. 12-354, Apr. 17, 2015, pp. 1-187.

\* cited by examiner

FREQUENCY SPECTRUM ASSIGNMENT

TECHNICAL FIELD

The present disclosure generally relates to frequency spectrum assignment performed by a spectrum management device and, more particularly, to determining an access spectrum assignment and a failover spectrum assignment for a radio access node.

BACKGROUND

Wireless communication is commonly performed through the exchange of electromagnetic signals within a particular portion of the electromagnetic spectrum. Radio communication in particular is commonly performed though the exchange of signals within a subset of the electromagnetic spectrum called the radio spectrum (which is typically considered to lie between 3 Hz and 3 THz). To facilitate practical and coordinated use of the radio spectrum, different bands of the radio spectrum have been set aside for particular uses. For example, longwave communication is typically performed in the low frequency (LF) range between 148.5 kHz and 283.5 kHz, whereas shortwave communication is typically performed in the high frequency (HF) range between 5.9 MHz and 26.1 MHz. Other bands are used for a variety of purposes, including communication via Long Term Evolution (LTE), Global System for Mobile Communication (GSM), Wi-Fi, and others. The tuning of radio circuitry allows for signals to be transmitted and received at a particular frequency so that radio signals can be wirelessly sent and received between radio stations, such as mobile stations and/or base stations.

Spectrum for performing radio communication is a finite resource. The more crowded transmissions are within a given spectrum, the more those transmissions tend to interfere with each other. As society continues to embrace radio communication, the available spectrum has become increasingly utilized, and therefore increasingly crowded. To assist in the coordination of access to one or more bands of spectrum by one or more radio devices, a spectrum management device can be used.

SUMMARY

The present disclosure generally relates to a spectrum management device that determines spectrum assignments for a radio access node in advance of a conflict in spectrum resource usage between the radio access node and an incumbent user. In particular, the spectrum assignments comprise an access spectrum assignment and a failover spectrum assignment for replacing at least part of the access spectrum assignment responsive to the conflict. Upon notification to discontinue use of the at least part of the access spectrum assignment due to the conflict, the radio access node replaces the at least part of the access spectrum assignment with at least part of the failover spectrum assignment. According to particular embodiments, the assignment of the failover spectrum assignment prior to the conflict enables the radio access node to resolve the conflict quickly, while maintaining available spectrum bandwidth, and without having to generate additional signaling to determine a spectrum utilization solution after discovery of the conflict.

Embodiments of the present disclosure comprise a method implemented in a spectrum management device. The method comprises determining spectrum assignments for a radio access node. The spectrum assignments comprise an access spectrum assignment. The spectrum assignments further comprise a failover spectrum assignment for replacing at least part of the access spectrum assignment responsive to a conflict between the radio access node and an incumbent user with respect to the access spectrum assignment. The method further comprises notifying the radio access node of the spectrum assignments.

In some embodiments, the method further comprises detecting the conflict between the radio access node and the incumbent user with respect to the access spectrum assignment, and in response, notifying the radio access node to discontinue use of the at least part of the access spectrum assignment.

In some embodiments, determining the spectrum assignments comprises determining the spectrum assignments based on a Priority Access License (PAL) received from the radio access node.

In some embodiments, the access spectrum assignment comprises a first amount of spectrum from a priority access frequency band. Further, the failover spectrum assignment comprises one or both of a second amount of spectrum from the priority access frequency band and a third amount of spectrum from a non-priority access frequency band. Further, the priority access spectrum assignment and failover spectrum assignment are disjoint. In one embodiment, a total amount of spectrum comprised in the failover spectrum assignment is equal to the first amount of spectrum from the priority access frequency band.

In some embodiments, the method further comprises, responsive to the incumbent user releasing spectrum resources from the priority access frequency band, assigning a new priority access spectrum assignment to the radio access node.

In some embodiments, assigning the spectrum assignments is responsive to negotiating one or both of the priority access spectrum assignment and the failover spectrum assignment with another spectrum management device.

Other embodiments of the present disclosure comprise a method implemented in a radio access node. The method comprises receiving spectrum assignments from a spectrum management device. The spectrum assignments comprise an access spectrum assignment. The spectrum assignments further comprise a failover spectrum assignment for replacing at least part of the access spectrum assignment responsive to a conflict between the radio access node and an incumbent user with respect to the access spectrum assignment. The method further comprises responsive to receiving the spectrum assignments, commencing radio communications according to the access spectrum assignment. The method further comprises receiving notification to discontinue use of the at least part of the access spectrum assignment, and in response, replacing the at least part of the access spectrum assignment with at least part of the failover spectrum assignment.

In some embodiments, the priority access spectrum assignment comprises a first amount of spectrum from a priority access frequency band. Further, the failover spectrum assignment comprises one or both of a second amount of spectrum from the priority access frequency band and a third amount of spectrum from a non-priority access frequency band. Further, the priority access spectrum assignment and failover spectrum assignment are disjoint. In one embodiment, a total amount of spectrum comprised in the failover spectrum assignment is equal to the first amount of spectrum from the priority access frequency band.

In some embodiments, the method further comprises, responsive to receiving the notification to discontinue use of the at least part of the access spectrum assignment, receiving a new access spectrum assignment from the spectrum management device.

In some embodiments, replacing the at least part of the access spectrum assignment with the at least part of the failover spectrum assignment comprises requesting a spectrum utilization report for a non-priority access frequency band, determining a non-priority spectrum within the non-priority access frequency band based on the spectrum utilization report, and exchanging radio communications on the determined non-priority spectrum.

In some embodiments, receiving the spectrum assignments is responsive to transmitting a Priority Access License (PAL) to the spectrum management device. In one embodiment, replacing the at least part of the access spectrum assignment with the at least part of the failover spectrum assignment is performed without retransmitting the PAL to the spectrum management device and without requesting a spectrum utilization report from the spectrum management device.

Other embodiments of the present disclosure comprise a spectrum management device. The spectrum management device comprises processing circuitry and interface circuitry communicatively coupled to the processing circuitry. The spectrum management device is configured to determine spectrum assignments for a radio access node. The spectrum assignments comprise an access spectrum assignment. The spectrum assignments further comprise a failover spectrum assignment for replacing at least part of the access spectrum assignment responsive to a conflict between the radio access node and an incumbent user with respect to the access spectrum assignment. The spectrum management device is further configured to notify the radio access node of the spectrum assignments.

In some embodiments, the spectrum management device is further configured to detect the conflict between the radio access node and the incumbent user with respect to the access spectrum assignment, and in response, notify the radio access node to discontinue use of the at least part of the access spectrum assignment.

In some embodiments, to determine the spectrum assignments the spectrum management device is configured to determine the spectrum assignments based on a Priority Access License (PAL) received from the radio access node.

In some embodiments, the access spectrum assignment comprises a first amount of spectrum from a priority access frequency band. Further, the failover spectrum assignment comprises one or both of a second amount of spectrum from the priority access frequency band and a third amount of spectrum from a non-priority access frequency band. Further, the priority access spectrum assignment and failover spectrum assignment are disjoint. In one embodiment, a total amount of spectrum comprised in the failover spectrum assignment is equal to the first amount of spectrum from the priority access frequency band.

In some embodiments, the spectrum management device is further configured to, responsive to the incumbent user releasing spectrum resources from the priority access frequency band, assign a new priority access spectrum assignment to the radio access node.

In some embodiments, the spectrum management device is configured to assign the spectrum assignments responsive to negotiating one or both of the priority access spectrum assignment and the failover spectrum assignment with another spectrum management device.

Other embodiments of the present disclosure comprise a radio access node. The radio access node comprises processing circuitry and interface circuitry communicatively coupled to the processing circuitry. The radio access node is configured to receive spectrum assignments from a spectrum management device. The spectrum assignments comprise an access spectrum assignment. The spectrum assignments further comprise a failover spectrum assignment for replacing at least part of the access spectrum assignment responsive to a conflict between the radio access node and an incumbent user with respect to the access spectrum assignment. The radio access node is further configured to, responsive to receiving the spectrum assignments, commence radio communications according to the access spectrum assignment. The radio access node is further configured to receive notification to discontinue use of the at least part of the access spectrum assignment, and in response, replace the at least part of the access spectrum assignment with at least part of the failover spectrum assignment.

In some embodiments, the priority access spectrum assignment comprises a first amount of spectrum from a priority access frequency band. Further, the failover spectrum assignment comprises one or both of a second amount of spectrum from the priority access frequency band and a third amount of spectrum from a non-priority access frequency band. Further, the priority access spectrum assignment and failover spectrum assignment are disjoint. In one embodiment, a total amount of spectrum comprised in the failover spectrum assignment is equal to the first amount of spectrum from the priority access frequency band.

In some embodiments, the radio access node is further configured to, responsive to receiving the notification to discontinue use of the at least part of the access spectrum assignment, receive a new access spectrum assignment from the spectrum management device.

In some embodiments, to replace the at least part of the access spectrum assignment with the at least part of the failover spectrum assignment, the radio access node is configured to request a spectrum utilization report for a non-priority access frequency band, determine a non-priority spectrum within the non-priority access frequency band based on the spectrum utilization report, and exchange radio communications on the determined non-priority spectrum.

In some embodiments, the radio access node is configured to receive the spectrum assignments responsive to transmitting a Priority Access License (PAL) to the spectrum management device. In one embodiment, the radio access node is configured to replace the at least part of the access spectrum assignment with the at least part of the failover spectrum assignment without retransmitting the PAL to the spectrum management device and without requesting a spectrum utilization report from the spectrum management device.

Other embodiments comprise a computer program, comprising instructions that, when executed on processing circuitry of a spectrum management device, cause the processing circuitry to determine spectrum assignments for a radio access node. The spectrum assignments comprise an access spectrum assignment. The spectrum assignments further comprise a failover spectrum assignment for replacing at least part of the access spectrum assignment responsive to a conflict between the radio access node and an incumbent user with respect to the access spectrum assignment. The instructions further cause the processing circuitry to notify the radio access node of the spectrum assignments.

Other embodiments comprise a computer program, comprising instructions that, when executed on processing circuitry of a radio access node, cause the processing circuitry to receive spectrum assignments from a spectrum management device. The spectrum assignments comprise an access spectrum assignment. The spectrum assignments further comprise a failover spectrum assignment for replacing at least part of the access spectrum assignment responsive to a conflict between the radio access node and an incumbent user with respect to the access spectrum assignment. The instructions further cause the processing circuitry to, responsive to receiving the spectrum assignments, commence radio communications according to the access spectrum assignment. The instructions further cause the processing circuitry to receive notification to discontinue use of the at least part of the access spectrum assignment, and in response, replace the at least part of the access spectrum assignment with at least part of the failover spectrum assignment.

Other embodiments comprise a carrier containing one or more of the computer programs described above, wherein the carrier is one of an electrical signal, optical signal, radio signal, or computer readable storage medium.

Other embodiments comprise a non-transitory computer-readable storage medium containing a computer program comprising executable instructions that, when executed by processing circuitry of one or more of the network nodes described above causes the network node to perform any one of the methods described above.

Of course, the present invention is not limited to the above features and advantages. Indeed, additional features and advantages are presented in the following detailed description, and in the accompanying drawings.

BRIEF DESCRIPTION OF THE DRAWINGS

Aspects of the present disclosure are illustrated by way of example and are not limited by the accompanying figures with like references indicating like elements. In general, the use of a reference numeral should be regarded as referring to the depicted subject matter generally, whereas discussion of a specific instance of an illustrated element will append a letter designation thereto (e.g., discussion of a spectrum management device 110, generally, as opposed to discussion of particular instances of spectrum management devices 110a, 110b).

DETAILED DESCRIPTION

As will be described in detail below, aspects of the present disclosure may be implemented entirely as hardware units, entirely as software modules (including firmware, resident software, micro-code, etc.), or as a combination of hardware units and software modules. For example, embodiments of the present disclosure may take the form of a non-transitory computer readable medium storing software instructions in the form of a computer program that, when executed on a programmable device, configures the programmable device to execute the various methods described below.

For clarity in understanding the disclosure below, to the extent that "one of" a conjunctive list of items (e.g., "one of A and B") is discussed, the present disclosure refers to one (but not both) of the items in the list (e.g., an A or a B, but not both A and B). Such a phrase does not refer to one of each of the list items (e.g., one A and one B), nor does such a phrase refer to only one of a single item in the list (e.g., only one A, or only one B). Similarly, to the extent that "at least one of" a conjunctive list of items is discussed (and similarly for "one or more of" such a list), the present disclosure refers to any item in the list or any combination of the items in the list (e.g., an A only, a B only, or both an A and a B). Such a phrase does not refer to one or more of each of the items in the list (e.g., one or more of A, and one or more of B).

Figure 1:
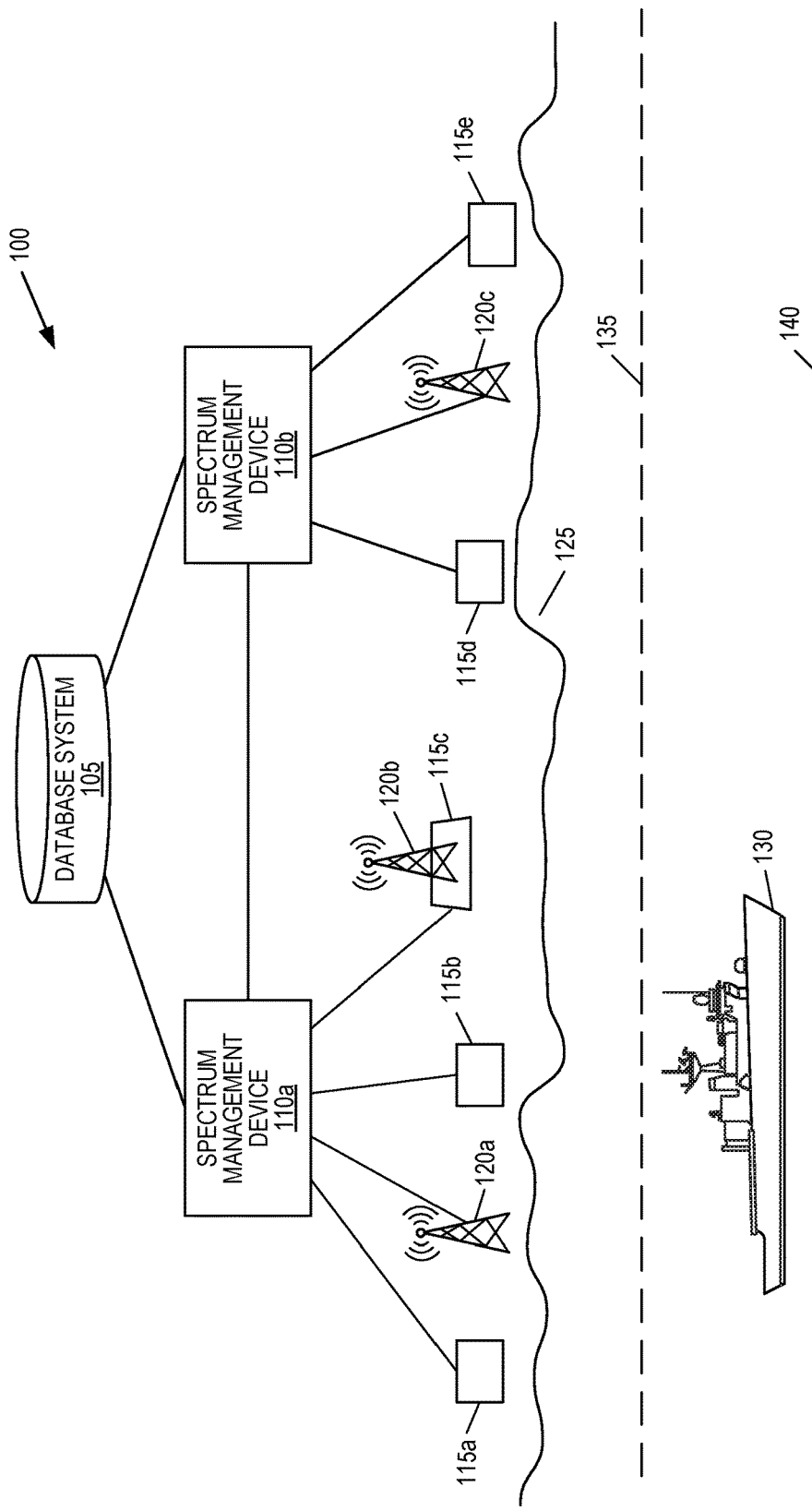
FIG. 1 is a block diagram illustrating an example environment supporting devices according to one or more embodiments of the present disclosure.

In general, embodiments of the present disclosure relate to one or more spectrum management devices and/or one or more radio access nodes. FIG. 1 illustrates an example environment 100 in which such spectrum management devices 110a, 110b and radio access node 120a-c are operating. In the example of FIG. 1, the environment 100 comprises a database system 105, two spectrum management devices 110a-b, three radio access nodes 120a-c, five radio sensor stations 115a-e, and an incumbent user 130.

Each of the radio access nodes 120a-c transmit and/or receive signals via one or more respective antennas. The collective signals are transmitted and/or received within a particular frequency spectrum through the air to mobile stations (not shown) within signal range 135. In some embodiments, these signals enable radio-based network access by the mobile stations via one or more of the radio access nodes 120a-c. Each of the radio access nodes 120a-c are also configured to electronically communicate with a spectrum management device 110, e.g., via a communications network (not shown). Examples of a radio access node 120 include a Citizens Broadband Radio Service Device (CBSD), radio base station (RBS), femtocell, and a wireless access point (WAP).

In this example, the radio access nodes 120a-c are arrayed along a coastline 125 to provide wireless network access to mobile stations along the coast, whether on land or at sea. Other embodiments may involve radio access nodes 120a-c that are located in other geographic settings.

Each of the spectrum management devices 110a-b is configured to exchange communications with one or more of the radio access nodes 120a-c. These communications may, according to embodiments, be performed via a communications network (not shown). According to other embodiments, the communications between a spectrum management device 110 and a radio access node 120 is performed via a direct coupling between the two, e.g., via one or more cables and/or buses. In such embodiments, the spectrum management device 110 and radio access node 120 may be, for example, components of the same device, network node, facility, installation, or local access system.

The communication between a spectrum management device 110 and a radio access node 120 may include, for example, a request from the radio access node 120 to the spectrum management device 110 for spectrum access. Such communication may also include a response from the spectrum management device 110 to the radio access node 120 that assigns particular spectrum resources to that radio access node 120. These spectrum resources may be in the frequency, time, and/or geographical domain, according to various embodiments. In this particular example, spectrum management device 110a communicates with, and manages access to spectrum resources by, radio access nodes 120a-b. Similarly, spectrum management device 110b communicates with, and manages access to spectrum resources by, radio access node 120c.

Each of the spectrum management devices 110a-b is also configured to communicate with one or more of the radio sensor stations 115a-e. In this particular example, spectrum management device 110a communicates with radio sensor stations 115a-c, and spectrum management device 110b communicates with radio sensor stations 115d-e. According to some embodiments, the spectrum management devices 110a-b may also communicate with each other, for example, to share information received from the radio sensor stations 115a-e, to share information about spectrum resources assigned to the corresponding radio access nodes 120a-c, and/or to negotiate the assignment of resources to be assigned to the radio access nodes 120a-c.

Each radio sensor station 115a-e detects radio signals transmitted. Collectively, the radio sensor stations 115a-e detect radio signals transmitted within a sensor range 140. In particular, radio sensor station 115c is a component of, attached to, and/or collocated with radio access node 120b. In this example, the radio sensor stations 115a-e are also arrayed along the coastline 125, and detect spectrum resource utilization along the coast, whether on land or at sea. In this particular example, the sensor range 140 of the radio sensor stations 115a-e extends farther from the coastline 125 than the signal range 135 of the radio access nodes 120a-c.

Each radio sensor station 115a-e reports the detected utilization of spectrum resources to its corresponding spectrum management device 110a-b. In this way, the spectrum management devices 110a-b receive feedback from the radio sensor stations 115a-e with regard to actual spectrum resources being utilized. According to embodiments, each of the spectrum management devices 110a-b may use such feedback to assign unutilized (or underutilized) spectrum resources to one or more corresponding radio access nodes 120a-c.

Some users in the environment 100 operate wireless systems that are of critical importance. For example, the operation of devices supporting military, police, ambulatory, and/or firefighting personnel may be necessary for the national defense, public safety, and/or lifesaving. Such a critically important user may be an incumbent user 130. An incumbent user 130 is defined as a user that is prioritized above all non-incumbent users of a given spectrum such that it may use any portion of that given spectrum at any time without notice. All non-incumbent users are required to accommodate use of spectrum resources by the incumbent user 130, e.g., by evacuating those resources as necessary and/or keeping such portion of the spectrum clear.

In the particular example of FIG. 1, the incumbent user 130 is illustrated as a military vessel operating a radar system within the sensor range 140 of the radio sensor stations 115a-e. Radar is a system that determines the presence and location of one or more objects by transmitting a radio wave and measuring the time it takes for an echo of that radio wave to return. Each of the radio sensor stations 115a-e that detects this use of spectrum resources by incumbent user 130 reports the use of those spectrum resources to a corresponding spectrum management device 110a-b. In some embodiments, one or more of the radio sensor stations 115a-e also reports information useful for determining the location of the incumbent user 130, e.g., a spectrum resource utilization detection time, an identification of the incumbent user 130, and/or position information. The spectrum management devices 110a-b, in response, notify one or more of their corresponding radio access nodes 120a-c to discontinue use of the spectrum resources being used by the incumbent user 130, e.g., to prevent interference with the operation of the incumbent user 130 by the one or more radio access nodes 120a-c.

In this particular example, the radio sensor stations 115a-e are configured such that their sensor range 140 allows them to detect the radar system operated by the incumbent user 130 before the incumbent user 130 enters the signal range 135 of the radio access nodes 120a-c (i.e., when the incumbent user 130 approaches the coastline 125 by sea with its radar system active). As will be discussed in greater detail below, such a design may, in some embodiments, avoid interfering utilization of the same spectrum resources between one or more of the radio access nodes 120a-c and the incumbent user 130.

In some embodiments, the utilization of spectrum resources by a user (whether incumbent or not) is spontaneous and/or anonymous. For example, a military vessel that is an incumbent user 130 may spontaneously and anonymously use spectrum resources because the movement and operation of the military vessel may be purposefully clandestine (such as for national security reasons). In contrast, a pirate broadcaster that is not an incumbent user 130 may also decide to spontaneously and anonymously use those spectrum resources.

Accordingly, embodiments of the present disclosure include a spectrum management device 110 that determines that a particular user detected by a radio sensor station 115 is an incumbent user 130, e.g., to determine whether spectrum needs to be cleared for the detected use.

In some embodiments, the determination that a particular user is an incumbent user 130 is based (at least in part) on that user's location. For example, an emergency broadcast system may be an incumbent user 130 that intermittently operates radio equipment at a fixed location known to one or more of the spectrum management devices 110a-c. In response to information from one or more radio sensor stations 115a-e indicating that spectrum resources are being utilized from that location, one or more of the spectrum management devices 110a-b may notify one or more radio access nodes 120a-c to discontinue use of those spectrum resources. The location of the incumbent user 130 may be determined, e.g., by the time-of-arrival of a signal originating from the incumbent user 130 that is detected by two or more of the radio sensor stations 115a-e. Other positioning approaches may also be employed, according to various embodiments.

In a different example, a spectrum management device 110 does not know the location of an incumbent user 130 within the environment 100 in advance of the incumbent user 130 being detected by a radio sensor station 115, such as in the case of the clandestine military vessel discussed above. In such an example, a spectrum management device 110 may communicate with the database system 105 to determine that the source of spectrum utilization is an incumbent user 130. According to embodiments, this database system 105 is operated by a government agency and/or regulatory authority (e.g., the United States Federal Communications Commission) and is aware of the location of the incumbent user 130 of FIG. 1. In response to determining that spectrum resources are being used at a particular location (e.g., based on reports from one or more radio sensor stations 115a-e), a spectrum management device 110 queries the database system 105 for whether there is an incumbent user 130 at the detected location. If the database system 105 responds by indicating that an incumbent user is at the detected location, the spectrum management device 110 sends notification to discontinue use of those spectrum resources (e.g., to one or more corresponding radio access nodes).

Various embodiments of the present disclosure mitigate or avoid disruption caused by notifying a radio access node 120 to discontinue use of spectrum resources that are being actively used for radio communication. In some embodiments, such notification to discontinue use of spectrum resources may be transmitted by a spectrum management device 110 regardless of whether or not any particular radio access node 120 is actually using those resources. For example, in particular embodiments, a spectrum management device 110 may notify a radio access node 120 to discontinue use 130 of spectrum resources even though the radio access node 120 has not commenced utilization of those resources. In such cases, the notification to discontinue use may serve to notify the radio access node 120 to avoid use of the given resources. In other embodiments, the spectrum management device 110 may determine that the radio access node 120 has commenced utilization of those resources, and notify the radio access node 120 to discontinue use in response.

As will be discussed in greater detail below, embodiments of the present disclosure replace conflicted resources with pre-assigned failover resources that are already authorized for active use by a spectrum management device 110. According to some embodiments, the pre-assignment of these failover resources enables the radio access node 120 to resolve the conflict quickly, while maintaining available spectrum bandwidth, and without having to generate additional signaling to determine a spectrum utilization solution after discovery of the conflict. In some embodiments, a radio access node 120 also notifies one or more mobile stations being served by that radio access node 120 to switch to the failover resources. Such notification to a mobile station may, for example, further clear the spectrum resources for use by the incumbent user 130. According to particular embodiments, a conflict comprises actual and/or predicted simultaneous utilization of the same spectrum resources by both a radio access node 120 and an incumbent user 130.

Figure 2A:
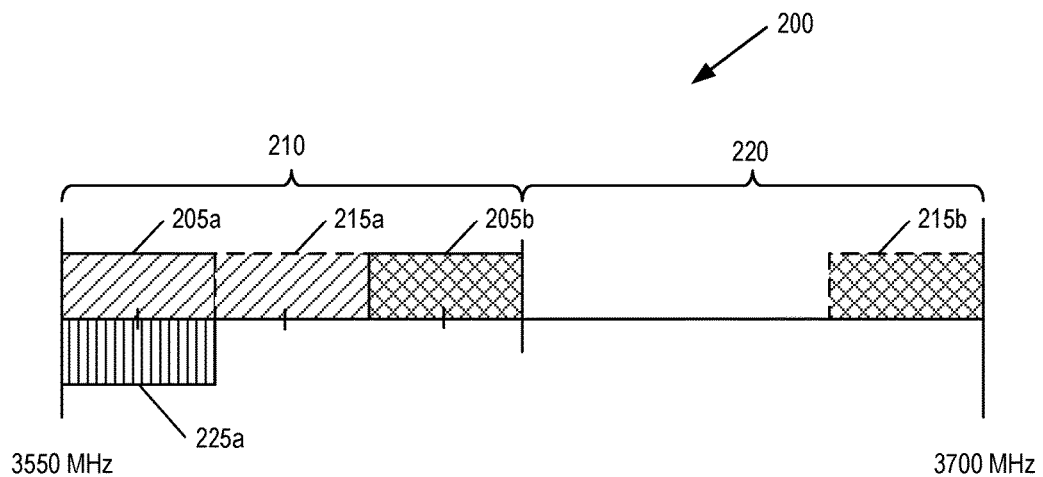
FIGS. 2A-F are block diagrams illustrating examples of spectrum utilization according to some of the embodiments of the present disclosure.

FIG. 2A illustrates an example of spectrum assignments 205a-b, 215a-b, one of which is in conflict with resources 225a utilized by an incumbent user 130 within a spectrum 200. The spectrum 200 spans frequencies from 3550 MHz to 3700 MHz. The spectrum 200 comprises different frequency bands 210, 220. In this particular example, the spectrum 200 comprises a priority access frequency band 210 on the 3550 MHz end of the spectrum 200, and an adjacent non-priority access frequency band 220 on the 3700 MHz end of the spectrum 200. According to this example, the priority access frequency band 210 comprises six evenly-sized slots.

The priority access frequency band 210 supports priority access by one or more priority access licensees. A priority access licensee may, for example, have a Priority Access License (PAL) issued by an appropriate authority (e.g., the United States Federal Communications Commission) to operate radio equipment in the priority access frequency band 210 on a basis that is protected from interference by certain other users (e.g., other priority access licensees and/or general access users, but not incumbent users, as will be discussed in greater detail below). According to some embodiments, a spectrum management device 110 determines spectrum assignments 205, 215 based on a PAL received from a radio access node 120.

As shown in the example of FIG. 2A, spectrum management device 110a has assigned an access spectrum assignment 205a and a failover spectrum assignment 215a to radio access node 120a, e.g., via one or more messages. In addition, spectrum management device 110a has assigned an access spectrum assignment 205b and a failover spectrum assignment 215b to radio access node 120b, e.g., via one or more messages. In response to receiving their respective spectrum assignments 205a-b, 215a-b from the spectrum management device 110a, the radio access nodes 120a-b each commence radio communications according to their respective access spectrum assignments 205a-b. According to this example, each of the access spectrum assignments 205a-b are two slots wide within the priority access frequency band 210. According to some embodiments, the radio access node 120a determined that the access spectrum assignments 205a-b should be each two slots wide based on having received two PALs from each of the radio access nodes 120a-b.

Unlike the access spectrum assignments 205a-b, the failover spectrum assignments 215a-b are not being actively used by their corresponding radio access nodes 120a-b for radio communication, as illustrated by the dashed outline. Rather, the failover spectrum assignments 215a-b are used for replacing at least part of their corresponding access spectrum assignments 205a-b responsive to a conflict between the corresponding radio access node 120 and an incumbent user 130 (e.g., in order to resolve the conflict). In this example, each of the failover spectrum assignments 215a-b comprise an amount of spectrum equal to the amount of spectrum in their corresponding access spectrum assignments 205a-b, respectively. Accordingly, each of the failover spectrum assignments 215a-b comprise enough spectrum 200 to replace the entirety of their corresponding access spectrum assignments 205a-b. Other embodiments include a failover spectrum assignment 215 that comprises an amount of spectrum that is different than the amount of spectrum in its corresponding access spectrum assignment 205.

According to various embodiments, an incumbent user 130 may use any of the resources in the spectrum 200, including resources within the priority access frequency band 210 and/or the non-priority access frequency band 220, at any time and without notice. In one or more embodiments, the spectrum management device 110 notifies a radio access node 120 to discontinue use of at least part of an access spectrum assignment 205 in response to an incumbent user 130 utilizing spectrum resources in conflict with that part of the access spectrum assignment 205. In some embodiments, the spectrum management device 110 notifies the radio access node 120 to discontinue use of spectrum resources only when those spectrum resources are in the priority access frequency band 210.

One or more non-incumbent users may also use the non-priority access frequency band 220 at any time and without notice, according to embodiments. According to other embodiments, a user (e.g., a general access user) transmits a request for a spectrum utilization report from a spectrum management device 110a before utilizing spectrum resources of the non-priority access frequency band 220. The spectrum utilization report indicates spectrum resources that are presently in use. Based on this spectrum utilization report, the user determines which spectrum resources from the non-priority access frequency band 220 to use. Priority access licensees and incumbent users 130 may also request a spectrum utilization report from a spectrum management device 110 and utilize the non-priority access frequency band 220.

In the example of FIG. 2A, an incumbent user 130 is utilizing resources 225a in the priority access frequency band 220. The utilization of these resources 225a conflicts with the entirety of access spectrum assignment 205a assigned to radio access node 120a. The spectrum management device 120a receives notice of this utilization from one or more of the radio sensor stations 115a-e at a given location (e.g., based on the time-of-arrival of a signal detected by two or more of the radio sensor stations 115a-e). In response, the spectrum management device 110a queries the database 105 to determine whether an incumbent user 130 is at the given location. The database responds to the spectrum management device 110a by indicating that an incumbent user 130 is at the specified location. In response, the spectrum management device 110a notifies the radio access node 120a to discontinue use of access spectrum assignment 205a.

Figure 2B:
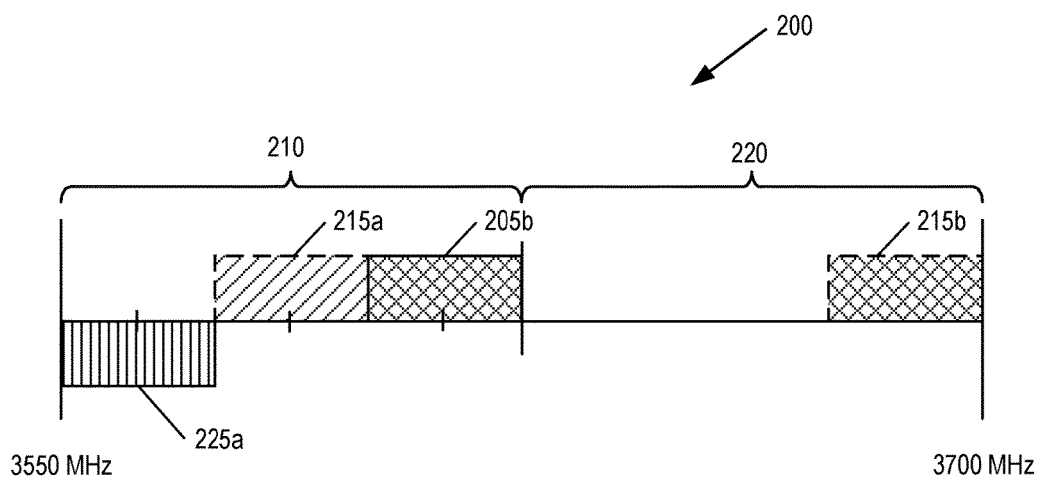

FIG. 2B illustrates an example of the spectrum 200 after the radio access node 120a is notified to discontinue use of access spectrum assignment 205a responsive to the example conflict of FIG. 2A. As shown in FIG. 2B, the radio access node 120a discontinues use of access spectrum assignment 205a, replacing the entirety of the access spectrum assignment 205a with the failover spectrum assignment 215a. The spectrum assignments 205b, 215b are unaffected, as the utilization of resources 225a by the incumbent user 130 created no conflict for radio access node 120b. In some embodiments, in response to the incumbent user 130 releasing spectrum resources 225a from the priority access frequency band 210, the spectrum management device 110a notifies the radio access node 120a that it may resume use of access spectrum assignment 205a. In other embodiments, in response to the incumbent user 130 releasing spectrum resources 225a from the priority access frequency band 210, the spectrum management device 110a assigns to the radio access node 120a a new access spectrum assignment (not shown).

Figure 2C:
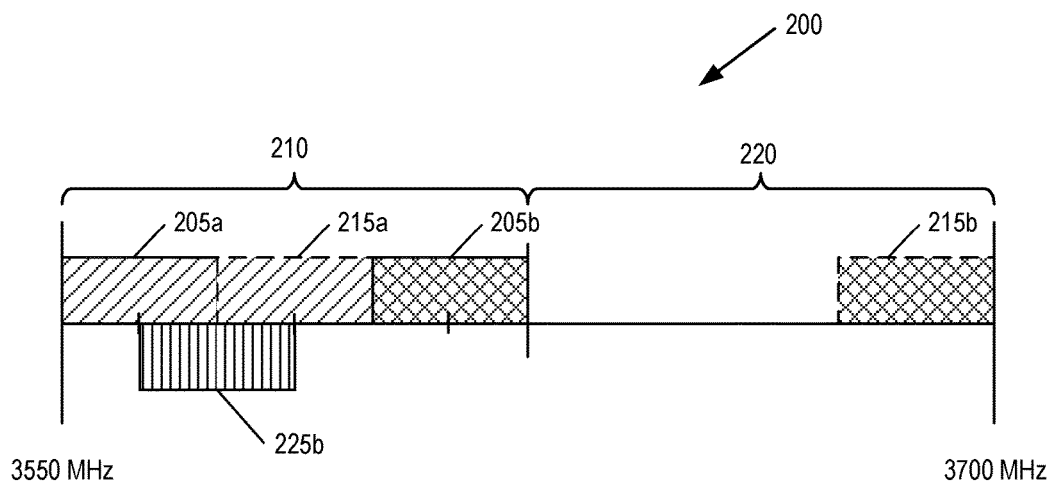

FIG. 2C illustrates another example of a conflict between the radio access node 120a and the incumbent user 130 with respect to access spectrum assignment 205a. In this example, the resources 225b utilized by the incumbent user 130 are in conflict with part of access spectrum assignment 205a and part of failover spectrum assignment 215a. The spectrum management device 110a notifies the radio access node 120a to discontinue use of the parts of the access spectrum assignment 205a and failover spectrum assignment 215a that are in conflict with those resources 225b.

Figure 2D:
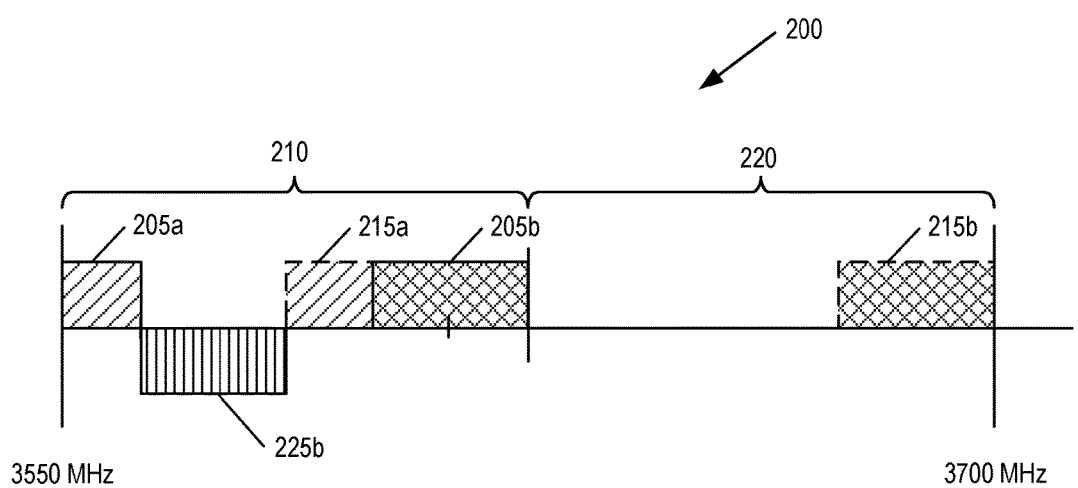

FIG. 2D illustrates an example of the spectrum 200 responsive to the example conflict of FIG. 2C. In this example, the radio access node 120a discontinues use of the parts of the access spectrum assignment 205a and failover spectrum assignment 215a that were in conflict with resources 225b. In particular, the radio access node 120a replaces the high frequency slot of access spectrum assignment 205a with the high frequency slot of failover spectrum assignment 215a. The spectrum assignments 205b, 215b are again unaffected, as the utilization of resources 225b by the incumbent user 130 created no conflict for radio access node 120b.

In some embodiments, the low frequency slot of failover spectrum assignment 215a, as shown in FIG. 2D, is abandoned due to the conflict with the resources 225b utilized by the incumbent user 130. In other embodiments, the low frequency slot of failover spectrum assignment 215a is retained, but is not actively used for radio communication by the radio access node 120a until the incumbent user 130 stops using the high frequency slot of the resources 225b.

Figure 2E:
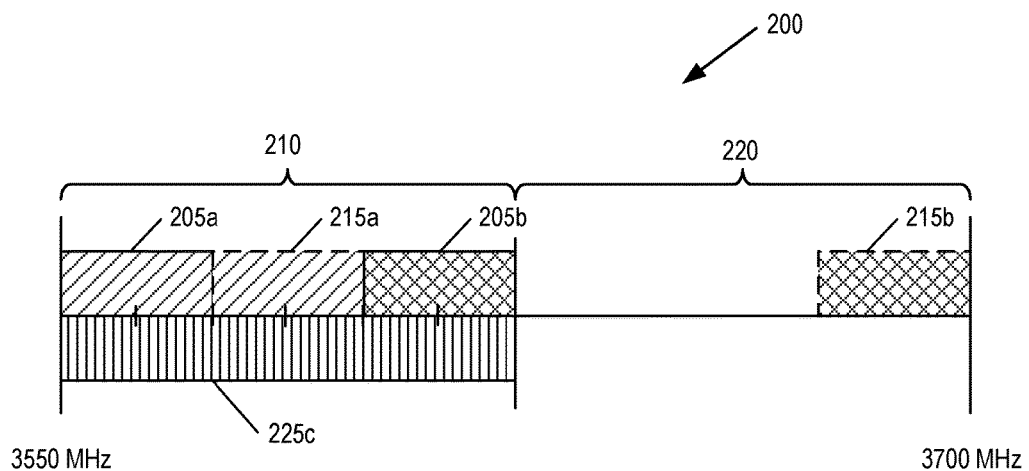

FIG. 2E illustrates an example of a conflict between each of radio access nodes 120a-b and the incumbent user 130 with respect to access spectrum assignments 205a-b. In this example, the resources 225c utilized by the incumbent user 130 are in conflict with the entirety of spectrum access assignments 205a-b, as well as the entirety of failover spectrum assignment 215a. The spectrum management device 110a notifies the radio access node 120a to discontinue use of access spectrum assignment 205a and failover spectrum assignment 215a. The spectrum management device 110a also notifies the radio access node 120b to discontinue use of access spectrum assignment 205b.

Figure 2F:
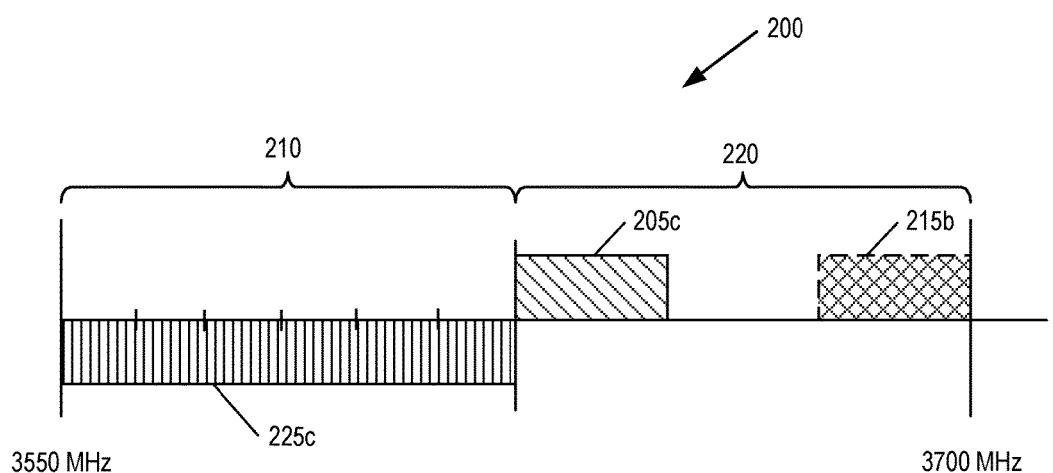

FIG. 2F illustrates an example of the spectrum 200 responsive to the example conflict of FIG. 2E. In this example, the radio access node 120b discontinues use of access spectrum assignment 205b, replacing the entirety of the access spectrum assignment 205b with the failover spectrum assignment 215b. However, radio access node 120a is unable to replace any part of access spectrum assignment 205a with any part of failover spectrum assignment 215a due to the utilization of resources 225c by the incumbent user 130. Accordingly, the radio access node 120b determines a new access spectrum assignment 205c from the non-priority access frequency band 220 to replace the old access spectrum assignment 205a.

In some embodiments, to determine the new access spectrum assignment 205c, the radio access node 120a transmits a request for a spectrum utilization report to spectrum management device 110a. Spectrum management device 110a responds with the spectrum resources that are presently in use, including failover spectrum assignment 215b and spectrum resources 225c. Based on this spectrum utilization report, the radio access node 120b determines a new access spectrum assignment 205c from the non-priority access frequency band 220 to replace the old access spectrum assignment 205a. In some embodiments, the radio access node 120a requests the spectrum utilization report in response to transmitting a PAL to the spectrum management device 110a and receiving a response indicating that no spectrum from the priority access frequency band 210 is available.

Although FIG. 2F illustrates a new access spectrum assignment 205c in the non-priority access frequency band 220, according to some embodiments, the spectrum resources 225c do not consume the entire priority access frequency band 210, but still conflict with both the access spectrum assignment 205a and the failover spectrum assignment 215a. In such a scenario, the new access spectrum assignment 205c may be, at least in part, in a portion of the priority access frequency band 210 not used by the incumbent user 130. For example, to determine the new access spectrum assignment 205c, the radio access node 120a may transmit a PAL to the spectrum management device 110 and receive a response comprising the the new access spectrum assignment 205c in the priority access frequency band 210. Other combinations of the above examples may also occur, according to various embodiments.

Although the examples of FIGS. 2A-2F illustrate a spectrum from 3550 MHz to 3700 MHz, other embodiments may include a spectrum that of a different bandwidth and/or including different frequencies. Further, although FIGS. 2A-2F illustrate frequency bands 210, 220 that are evenly-sized, various embodiments include frequency bands 210, 220 of different sizes. For example, in some embodiments, the priority access frequency band 210 may be from 3550 MHz to 3650 MHz, whereas the non-priority access frequency band 220 may be from 3650 MHz to 3700 MHz. Other embodiments may include other bandwidths and/or frequencies.

Further, although the examples of FIGS. 2A-2F involve particular quantities of evenly-sized slots, other embodiments of the present disclosure may use differently-sized slots and/or different numbers of slots. Further, although FIGS. 2A-2F illustrate scenarios involving spectrum assignments 205a-b, 215a-b for two radio access nodes 120a-b, other embodiments may include fewer or additional radio access nodes 120.

Figure 3:
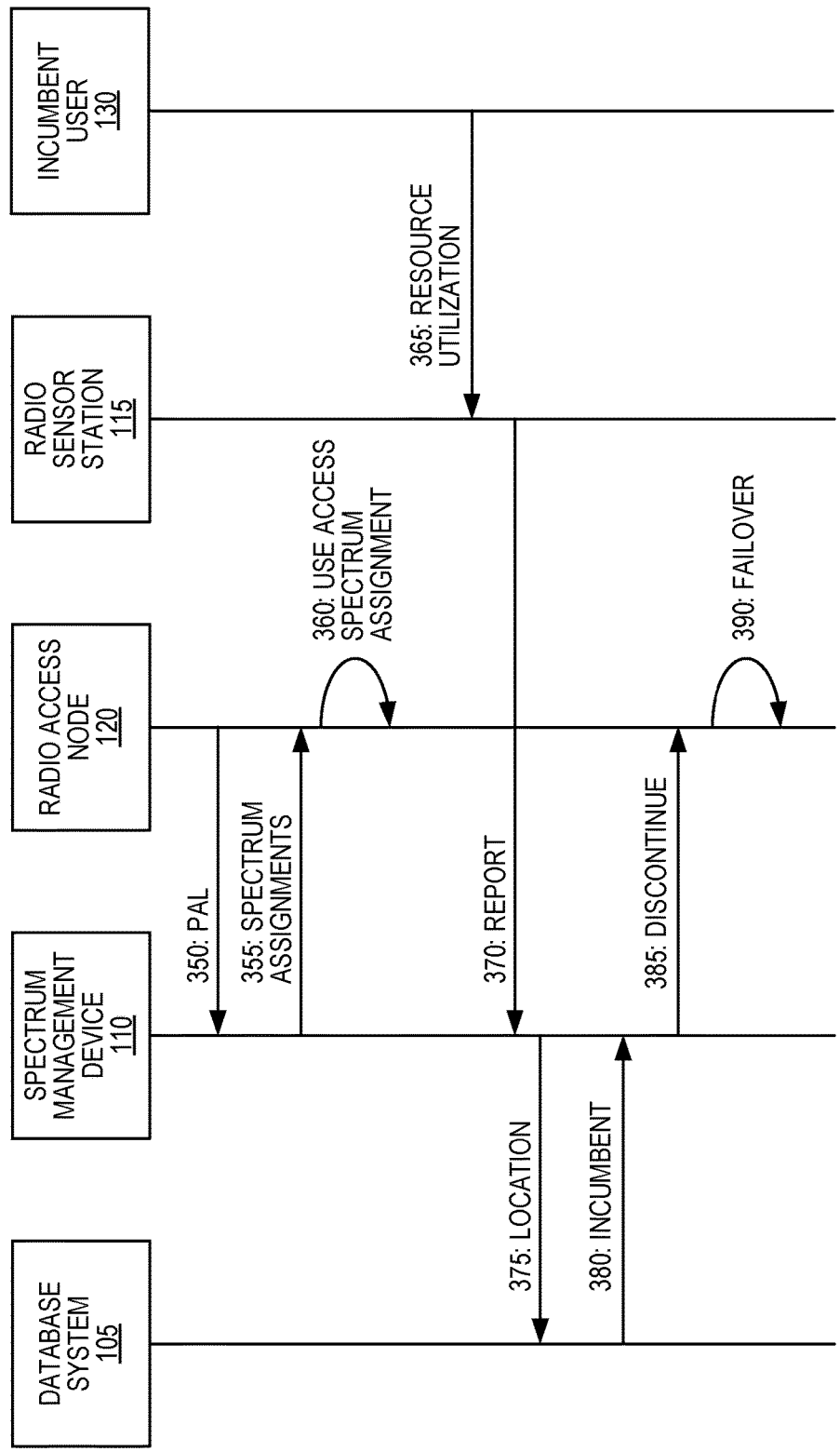
FIG. 3 is a signaling diagram illustrating an example of communication between devices according to one or more embodiments of the present disclosure.

FIG. 3 illustrates is a signaling diagram illustrating an example of communications between particular devices according to embodiments, in view of the above. According to the example of FIG. 3, a radio access node 120 requests access to spectrum resources by transmitting a PAL to a spectrum management device 110 (step 350). The spectrum management device 110 responds by sending spectrum assignments 205, 215 to the radio access node 120 (step 355). As discussed above, the spectrum assignments 205, 215 include an access spectrum assignment 205 and a failover spectrum assignment 215, which in this example were determined by the spectrum management device 110 based on the PAL. Having received both of the spectrum assignments 205, 215, the radio access node 120 begins using the access spectrum assignment 205, e.g., by exchanging radio communications with nearby mobile terminals (step 360).

After the radio access node 120 has begun using the access spectrum assignment 205 for communications, a radio sensor station 115 detects the utilization of spectrum resources 225 by an incumbent user 130 (step 365). In this particular example, the use of these spectrum resources 225 conflict with at least part of the access spectrum assignment 205. The radio sensor station 115 sends a report of the detected spectrum utilization to the spectrum management device 110 (step 370). In this particular example, the report includes information useful for determining the location of the incumbent user 130. The spectrum management device 110, having determined said location (as described above) queries a database system 105 for whether an incumbent user is at that location (step 375). The database system 105 responds to the spectrum management device 110 by indicating that an incumbent is at the specified location (step 380). In response, the spectrum management device 110 notifies the radio access node 120 to discontinue use of the part of the access spectrum assignment 205 in conflict with the utilization of spectrum resources 225 by the incumbent user 130 (step 385). In response, the radio access node 120 replaces that part of the access spectrum assignment 205 with at least part of the failover spectrum assignment 215 (step 390).

Figure 4:
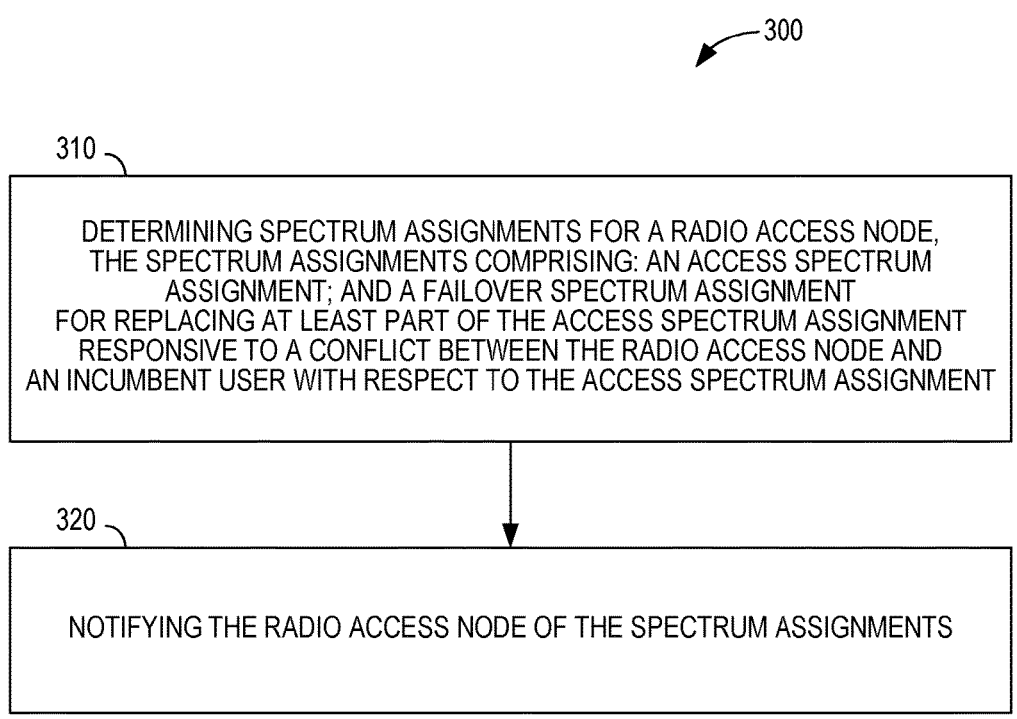
FIG. 4 is a flow diagram illustrating an example method implemented by a spectrum management device according to one or more embodiments of the present disclosure.

In view of the above, FIG. 4 illustrates an example method 300, implemented in a spectrum management device 110, according to one or more embodiments of the present disclosure. The method 300 comprises determining spectrum assignments 205, 215 for a radio access node 120 (block 310). The spectrum assignments 205, 215 comprise an access spectrum assignment 205. The spectrum assignments further comprise a failover spectrum assignment 215 for replacing at least part of the access spectrum assignment 205 responsive to a conflict between the radio access node 120 and an incumbent user 130 with respect to the access spectrum assignment 205. The method 300 further comprises notifying the radio access node 120 of the spectrum assignments (block 320).

Figure 5:
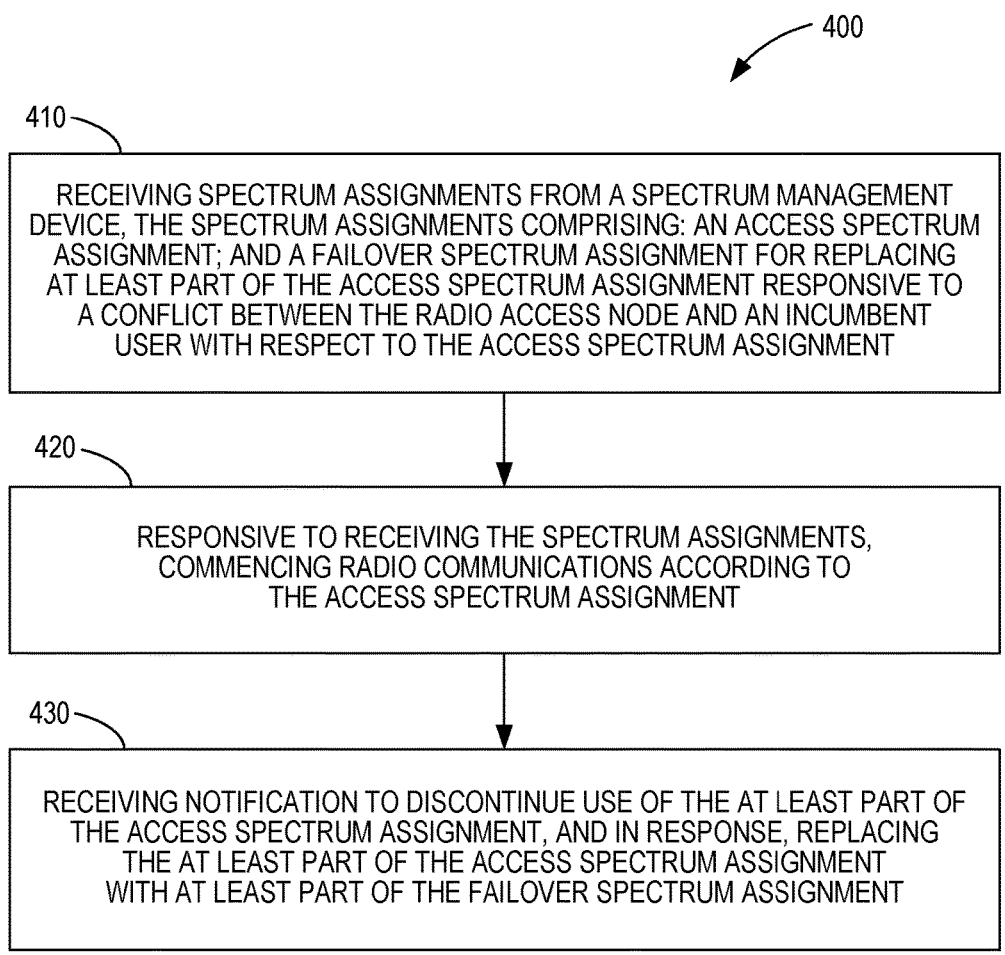
FIG. 5 is a flow diagram illustrating an example method implemented by a radio access node according to one or more embodiments of the present disclosure.

FIG. 5 illustrates an example method 400, implemented in a radio access node 120, according to one or more embodiments of the present disclosure. The method 400 comprises receiving spectrum assignments 205, 215 from a spectrum management device (block 410). The spectrum assignments comprise an access spectrum assignment 205. The spectrum assignments further comprise a failover spectrum assignment 215 for replacing at least part of the access spectrum assignment 205 responsive to a conflict between the radio access node 120 and an incumbent user 130 with respect to the access spectrum assignment 205. The method 400 further comprises, responsive to receiving the spectrum assignments 205, 215, commencing radio communications according to the access spectrum assignment 205 (block 420). The method 400 further comprises receiving notification to discontinue use of the at least part of the access spectrum assignment 205, and in response, replacing the at least part of the access spectrum assignment 205 with at least part of the failover spectrum assignment 215 (block 430).

Figure 6:
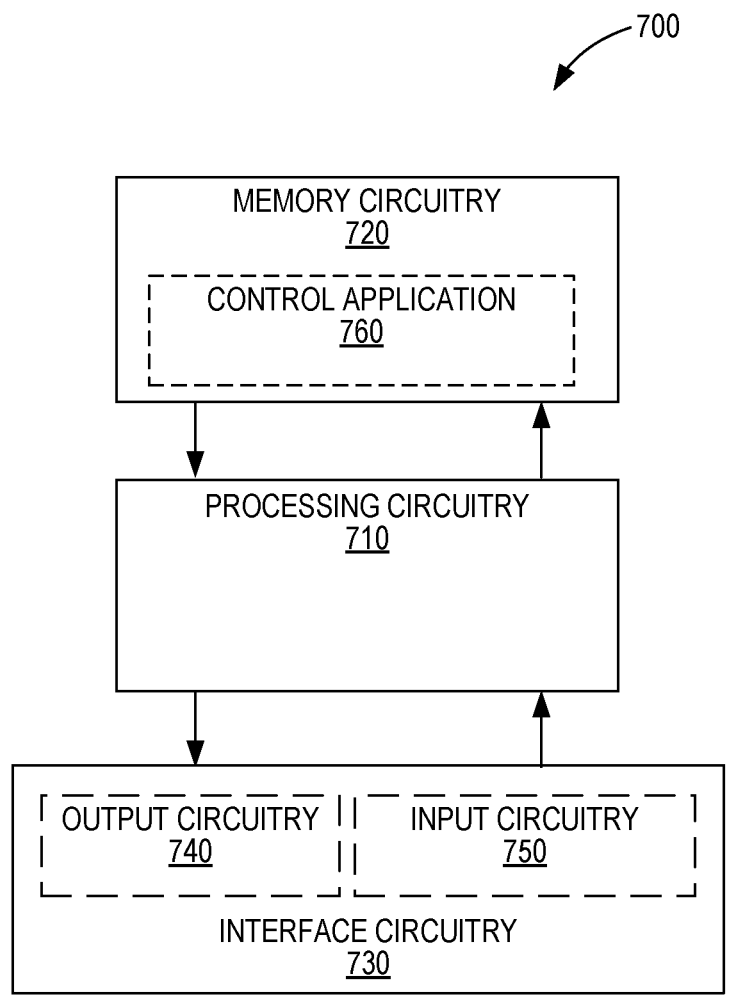
FIG. 6 is a block diagram illustrating example hardware configured according to one or more embodiments of the present disclosure.

Other embodiments of the present disclosure include the example hardware 700 illustrated in FIG. 6. The example hardware 700 is configurable for performing one or more of the methods described above. The example hardware 700 of FIG. 6 comprises processing circuitry 710, memory circuitry 720, and interface circuitry 730. The processing circuitry 710 is communicatively coupled to the memory circuitry 720 and the interface circuitry 730, e.g., via one or more buses. The processing circuitry 710 may comprise one or more microprocessors, microcontrollers, hardware circuits, discrete logic circuits, hardware registers, digital signal processors (DSPs), field-programmable gate arrays (FPGAs), application-specific integrated circuits (ASICs), or a combination thereof. For example, the processing circuitry 710 may be programmable hardware capable of executing software instructions stored as a machine-readable computer program 760 in the memory circuitry 720. The memory circuitry 720 of the various embodiments may comprise any non-transitory machine-readable media known in the art or that may be developed, whether volatile or non-volatile, including but not limited to solid state media (e.g., SRAM, DRAM, DDRAM, ROM, PROM, EPROM, flash memory, solid state drive, etc.), removable storage devices (e.g., Secure Digital (SD) card, miniSD card, microSD card, memory stick, thumb-drive, USB flash drive, ROM cartridge, Universal Media Disc), fixed drive (e.g., magnetic hard disk drive), or the like, wholly or in any combination.

The interface circuitry 730 may be a controller hub configured to control the input and output (I/O) data paths of the hardware 700. Such I/O data paths may include data paths for exchanging signals over a communications network. Such I/O data paths may also include data paths for exchanging signals with a user. For example, the interface circuitry 730 may comprise a transceiver configured to send and receive communication signals over one or more of a cellular network, Ethernet network, or optical network. The interface circuitry 730 may also comprise one or more of a graphics adapter, display port, video bus, touchscreen, graphical processing unit (GPU), display port, Liquid Crystal Display (LCD), and Light Emitting Diode (LED) display, for presenting visual information to a user. The interface circuitry 730 may also comprise one or more of a pointing device (e.g., a mouse, stylus, touchpad, trackball, pointing stick, joystick), touchscreen, microphone for speech input, optical sensor for optical recognition of gestures, and keyboard for text entry.

The interface circuitry 730 may be implemented as a unitary physical component, or as a plurality of physical components that are contiguously or separately arranged, any of which may be communicatively coupled to any other, or may communicate with any other via the processing circuitry 710. For example, the interface circuitry 730 may comprise output circuitry 740 (e.g., transmitter circuitry configured to send communication signals over the communications network) and input circuitry 750 (e.g., receiver circuitry configured to receive communication signals over the communications network). Similarly, the output circuitry 740 may comprise a display, whereas the input circuitry 750 may comprise a keyboard. Other examples, permutations, and arrangements of the above and their equivalents will be readily apparent to those of ordinary skill.

According to particular embodiments, the hardware 700 is comprised in a spectrum management device 110. In such embodiments, the interface circuitry 730 is configured to exchange communications via a network, e.g., to communicate with a radio access node 120, database 105, and/or radio sensor station 115. The processing circuitry 710 is configured to determine spectrum assignments 205, 215 for the radio access node 120. The spectrum assignments 205, 215 comprise an access spectrum assignment 205. The spectrum assignments 205, 215 further comprise a failover spectrum assignment 215 for replacing at least part of the access spectrum assignment 205 responsive to a conflict between the radio access node 120 and an incumbent user 130 with respect to the access spectrum assignment 205. The processing circuitry 710 is further configured to notify the radio access node 120 of the spectrum assignments 205, 215 via the interface circuitry 730.

According to other embodiments, the hardware 700 is comprised in a radio access node 120. In such embodiments, the interface circuitry 730 is configured to exchange communications via a network (e.g., to communicate with a spectrum management device 110) and to transmit and receive radio signals over an air interface. The processing circuitry 710 is configured to receive spectrum assignments 205, 215 from the spectrum management device 110 via the interface circuitry 730. The spectrum assignments 205, 215 comprise an access spectrum assignment 205. The spectrum assignments 205, 215 further comprise a failover spectrum assignment 215 for replacing at least part of the access spectrum assignment 205 responsive to a conflict between the radio access node 120 and an incumbent user 130 with respect to the access spectrum assignment 205. The processing circuitry 710 is further configured to, responsive to receiving the spectrum assignments 205, 215, commence radio communications according to the access spectrum assignment 205 via the interface circuitry 730. The processing circuitry 710 is further configured to receive notification to discontinue use of the at least part of the access spectrum assignment 205 via the interface circuitry 730, and in response, replace the at least part of the access spectrum assignment 205 with at least part of the failover spectrum assignment 215.

Figure 7:
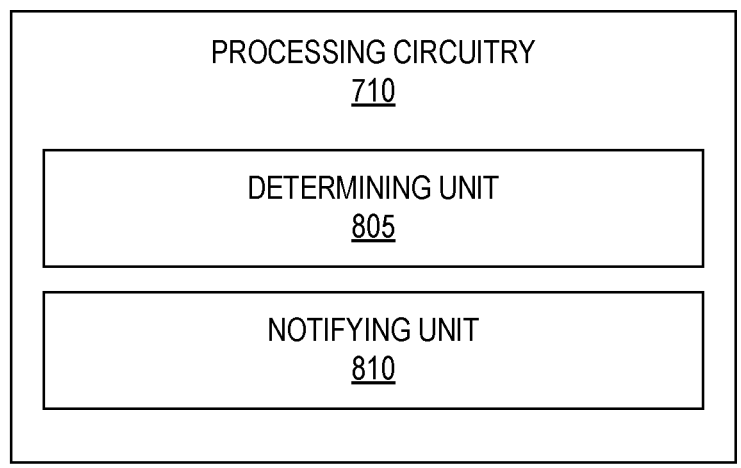
FIG. 7 is a block diagram illustrating a plurality of physical units comprised in processing circuitry of a spectrum management device according to one or more embodiments of the present disclosure.

FIG. 7 illustrates example processing circuitry 710 of a spectrum management device 110. The processing circuitry 710 of FIG. 7 comprises a plurality of physical units. In particular, this processing circuitry 710 comprises a determining unit 805 and a notifying unit 810. The determining unit 805 is configured to determine spectrum assignments 205, 215 for a radio access node 120. The spectrum assignments 205, 215 comprise an access spectrum assignment 205. The spectrum assignments 205, 215 further comprise a failover spectrum assignment 215 for replacing at least part of the access spectrum assignment 205 responsive to a conflict between the radio access node 120 and an incumbent user 130 with respect to the access spectrum assignment 205. The notifying unit 810 is configured to notify the radio access node 120 of the spectrum assignments 205, 215.

Figure 8:
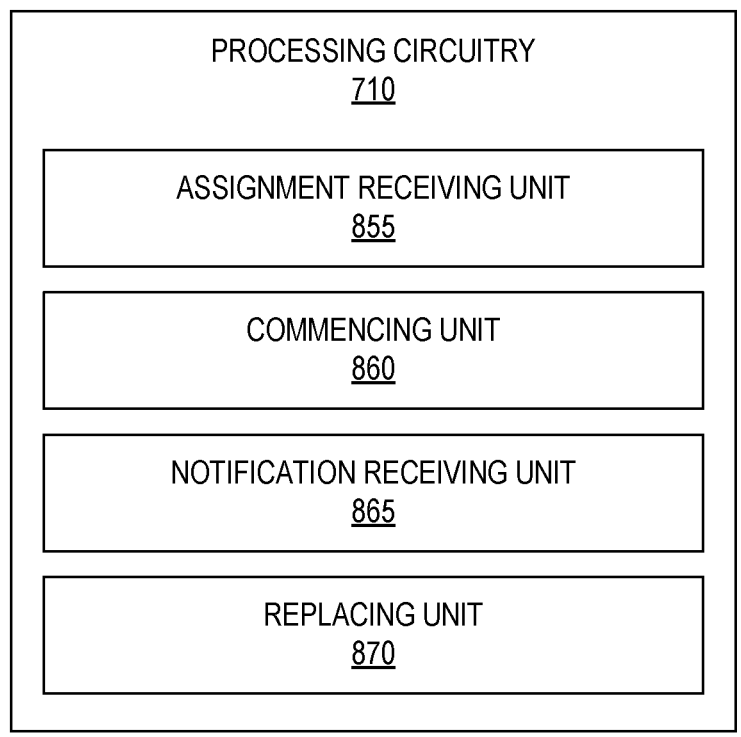
FIG. 8 is a block diagram illustrating a plurality of physical units comprised in processing circuitry of a radio access node according to one or more embodiments of the present disclosure.

FIG. 8 illustrates example processing circuitry 710 of a radio access node 120. The processing circuitry 710 of FIG. 8 comprises a plurality of physical units. In particular, this processing circuitry 710 comprises an assignment receiving unit 855, a commencing unit 860, a notification receiving unit 865, and a replacing unit 870. The assignment receiving unit 855 is configured to receive spectrum assignments 205, 215 from the spectrum management device 110. The spectrum assignments 205, 215 comprise an access spectrum assignment 205. The spectrum assignments 205, 215 further comprise a failover spectrum assignment 215 for replacing at least part of the access spectrum assignment 205 responsive to a conflict between the radio access node 120 and an incumbent user 130 with respect to the access spectrum assignment 205. The commencing unit 860 is configured to, responsive to the receiving of the spectrum assignments 205, 215, commence radio communications according to the access spectrum assignment 205. The notification receiving unit 865 is configured to receive notification to discontinue use of the at least part of the access spectrum assignment 205. In response, the replacing unit 870 is configured to replace the at least part of the access spectrum assignment 205 with at least part of the failover spectrum assignment 215.

Figure 9:
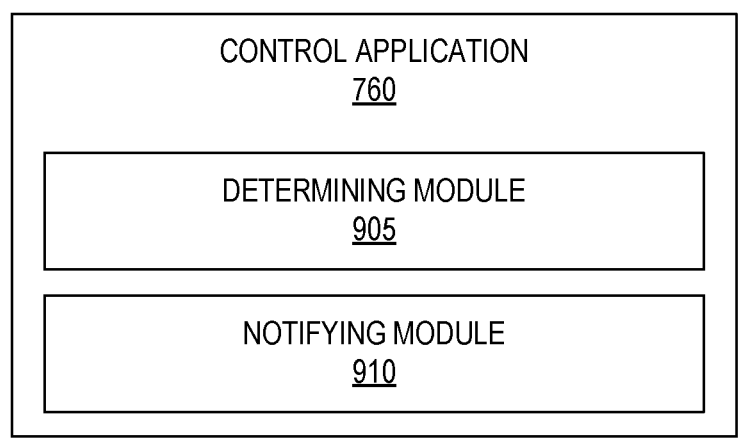
FIG. 9 is a block diagram illustrating a plurality of software modules comprised in control software for controlling a programmable spectrum management device according to one or more embodiments of the present disclosure.

FIG. 9 illustrates example control software 760 of a spectrum management device 110. The control software 760 of FIG. 9 comprises a plurality of software modules. In particular, this control software 760 comprises a determining module 905 and a notifying module 910. The determining module 905 is configured to determine spectrum assignments 205, 215 for a radio access node 120. The spectrum assignments 205, 215 comprise an access spectrum assignment 205. The spectrum assignments 205, 215 further comprise a failover spectrum assignment 215 for replacing at least part of the access spectrum assignment 205 responsive to a conflict between the radio access node 120 and an incumbent user 130 with respect to the access spectrum assignment 205. The notifying module 910 is configured to notify the radio access node 120 of the spectrum assignments 205, 215.

Figure 10:
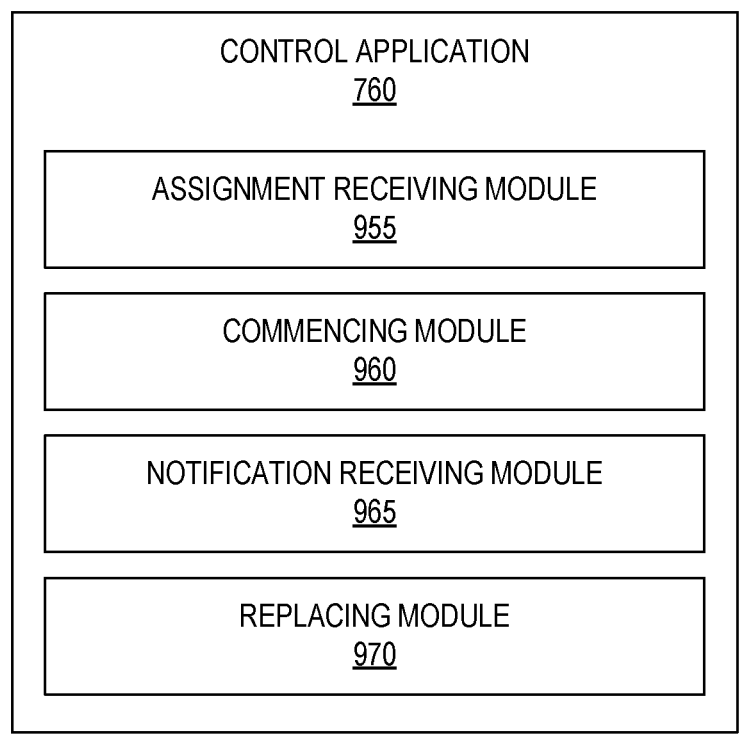
FIG. 10 is a block diagram illustrating a plurality of software modules comprised in control software for controlling a programmable radio access node configured according to one or more embodiments of the present disclosure.

FIG. 10 illustrates example control software 760 of a radio access node 120. The control software 760 of FIG. 10 comprises a plurality of physical units. In particular, this control software 760 comprises an assignment receiving module 955, a commencing module 960, a notification receiving module 965, and a replacing module 970. The assignment receiving module 955 is configured to receive spectrum assignments 205, 215 from the spectrum management device 110. The spectrum assignments 205, 215 comprise an access spectrum assignment 205. The spectrum assignments 205, 215 further comprise a failover spectrum assignment 215 for replacing at least part of the access spectrum assignment 205 responsive to a conflict between the radio access node 120 and an incumbent user 130 with respect to the access spectrum assignment 205. The commencing module 960 is configured to, responsive to the receiving of the spectrum assignments 205, 215, commence radio communications according to the access spectrum assignment 205. The notification receiving module 965 is configured to receive notification to discontinue use of the at least part of the access spectrum assignment 205. In response, the replacing module 970 is configured to replace the at least part of the access spectrum assignment 205 with at least part of the failover spectrum assignment 215.

The present invention may, of course, be carried out in other ways than those specifically set forth herein without departing from essential characteristics of the invention. The present embodiments are to be considered in all respects as illustrative and not restrictive, and all changes coming within the meaning and equivalency range of the appended claims are intended to be embraced therein.

What is claimed is:

1. A method, implemented in a spectrum management device, comprising:
   determining spectrum assignments for a radio access node, the spectrum assignments comprising:
      an access spectrum assignment; and
      a failover spectrum assignment for replacing at least part of the access spectrum assignment responsive to a conflict between the radio access node and an incumbent user with respect to the access spectrum assignment; and
   notifying the radio access node of the spectrum assignments;
   wherein the access spectrum assignment comprises a first amount of spectrum from a priority access frequency band;
   wherein the failover spectrum assignment comprises one or both of:
      a second amount of spectrum from the priority access frequency band; and
      a third amount of spectrum from a non-priority access frequency band; and
   wherein the access spectrum assignment and failover spectrum assignment are disjoint.

2. The method of claim 1, further comprising detecting the conflict between the radio access node and the incumbent user with respect to the access spectrum assignment, and in response, notifying the radio access node to discontinue use of the at least part of the access spectrum assignment.

3. The method of claim 1, wherein the determining the spectrum assignments comprises determining the spectrum assignments based on a Priority Access License (PAL) received from the radio access node.

4. The method of claim 1 wherein a total amount of spectrum comprised in the failover spectrum assignment is equal to the first amount of spectrum from the priority access frequency band.

5. The method of claim 1, further comprising, responsive to the incumbent user releasing spectrum resources from the priority access frequency band, assigning a new access spectrum assignment to the radio access node.

6. The method of claim 1, wherein the spectrum assignments are assigned responsive to negotiating one or both of the access spectrum assignment and the failover spectrum assignment with another spectrum management device.

7. A method, implemented in a radio access node, comprising:
   receiving spectrum assignments from a spectrum management device, the spectrum assignments comprising:
      an access spectrum assignment; and
      a failover spectrum assignment for replacing at least part of the access spectrum assignment responsive to a conflict between the radio access node and an incumbent user with respect to the access spectrum assignment;
   responsive to receiving the spectrum assignments, commencing radio communications according to the access spectrum assignment; and
   receiving notification to discontinue use of the at least part of the access spectrum assignment, and in response, replacing the at least part of the access spectrum assignment with at least part of the failover spectrum assignment;
   wherein the access spectrum assignment comprises a first amount of spectrum from a priority access frequency band;
   wherein the failover spectrum assignment comprises one or both of:
      a second amount of spectrum from the priority access frequency band; and
      a third amount of spectrum from a non-priority access frequency band; and
   wherein the access spectrum assignment and failover spectrum assignment are disjoint.

8. The method of claim 7 wherein a total amount of spectrum comprised in the failover spectrum assignment is equal to the first amount of spectrum from the priority access frequency band.

9. The method of claim 7, further comprising, subsequent to receiving the notification to discontinue use of the at least part of the access spectrum assignment, receiving a new access spectrum assignment from the spectrum management device.

10. The method of claim 7, wherein the replacing the at least part of the access spectrum assignment with the at least part of the failover spectrum assignment comprises:
   requesting a spectrum utilization report for the non-priority access frequency band;
   determining the at least part of the failover spectrum assignment within the non-priority access frequency band based on the spectrum utilization report; and
   exchanging radio communications on the determined at least part of the failover spectrum assignment.

11. The method of claim 7, wherein the receiving the spectrum assignments is responsive to transmitting a Priority Access License (PAL) to the spectrum management device.

12. The method of claim 11, wherein the replacing the at least part of the access spectrum assignment with the at least part of the failover spectrum assignment is performed without retransmitting the PAL to the spectrum management device and without requesting a spectrum utilization report from the spectrum management device.

13. A spectrum management device, comprising:
   processing circuitry;

memory containing instructions executable by the processing circuitry whereby the spectrum management device is operative to:
   determine spectrum assignments for a radio access node, the spectrum assignments comprising:
      an access spectrum assignment; and
      a failover spectrum assignment for replacing at least part of the access spectrum assignment responsive to a conflict between the radio access node and an incumbent user with respect to the access spectrum assignment; and
   notify the radio access node of the spectrum assignments;
wherein the access spectrum assignment comprises a first amount of spectrum from a priority access frequency band;
wherein the failover spectrum assignment comprises one or both of:
   a second amount of spectrum from the priority access frequency band; and
   a third amount of spectrum from a non-priority access frequency band; and
wherein the access spectrum assignment and failover spectrum assignment are disjoint.

14. A radio access node, comprising:
processing circuitry;
memory containing instructions executable by the processing circuitry whereby the radio access node is operative to:
   receive spectrum assignments from a spectrum management device, the spectrum assignments comprising:
      an access spectrum assignment; and
      a failover spectrum assignment for replacing at least part of the access spectrum assignment responsive to a conflict between the radio access node and an incumbent user with respect to the access spectrum assignment;
   responsive to receiving the spectrum assignments, commence radio communications according to the access spectrum assignment; and
   receive notification to discontinue use of the at least part of the access spectrum assignment, and in response, replace the at least part of the access spectrum assignment with at least part of the failover spectrum assignment;
wherein the access spectrum assignment comprises a first amount of spectrum from a priority access frequency band;
wherein the failover spectrum assignment comprises one or both of:
   a second amount of spectrum from the priority access frequency band; and
   a third amount of spectrum from a non-priority access frequency band; and
wherein the access spectrum assignment and failover spectrum assignment are disjoint.

\* \* \* \* \*